May 19, 1931. H. R. HOCKLEY 1,805,983
SYSTEM OF AND APPARATUS FOR OPERATING AND CONTROLLING
THE DOORS OF RAIL OR ROAD VEHICLES
Filed Dec. 4, 1928 7 Sheets-Sheet 2

May 19, 1931. H. R. HOCKLEY 1,805,983
SYSTEM OF AND APPARATUS FOR OPERATING AND CONTROLLING
THE DOORS OF RAIL OR ROAD VEHICLES
Filed Dec. 4, 1928 7 Sheets-Sheet 3
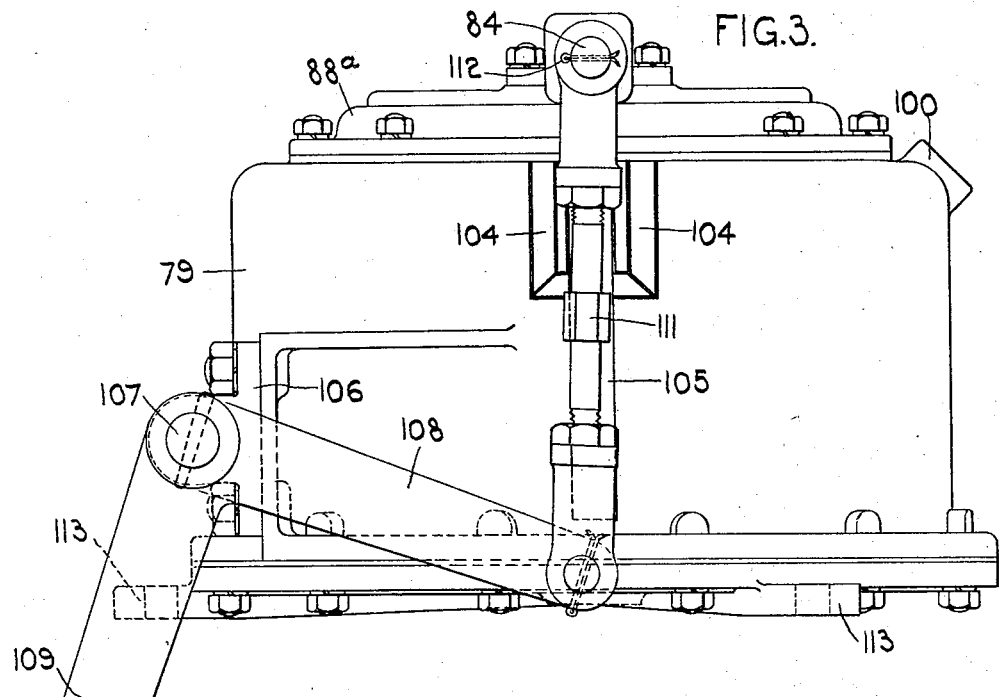
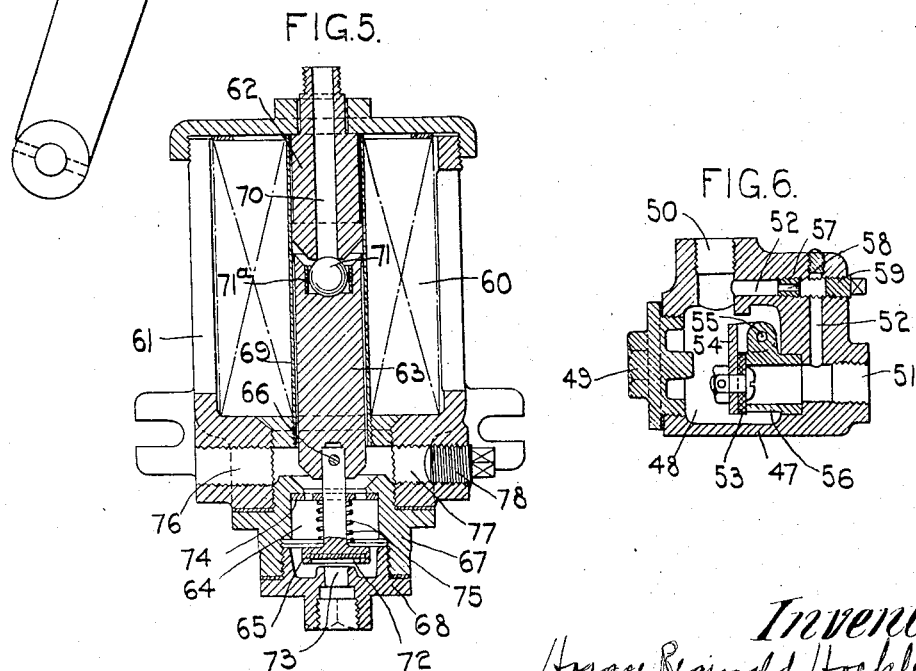
Inventor
Horace Reginald Hockley
by his Attys Darby & Darby

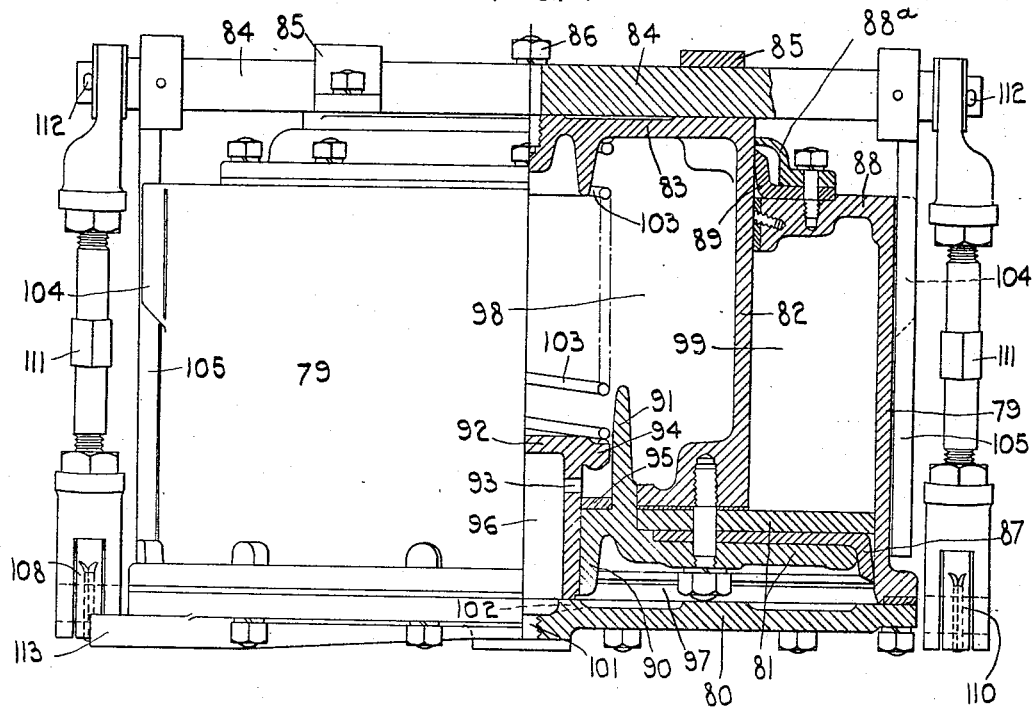

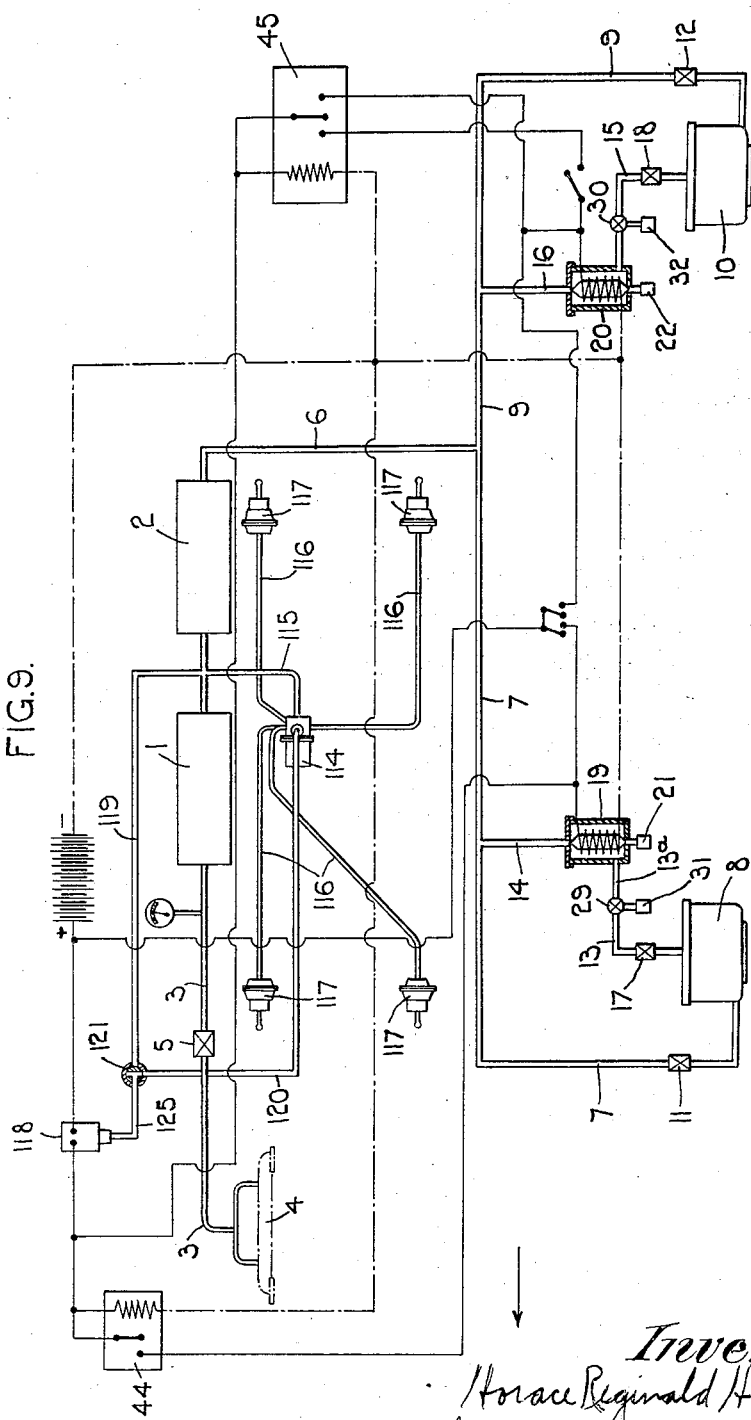

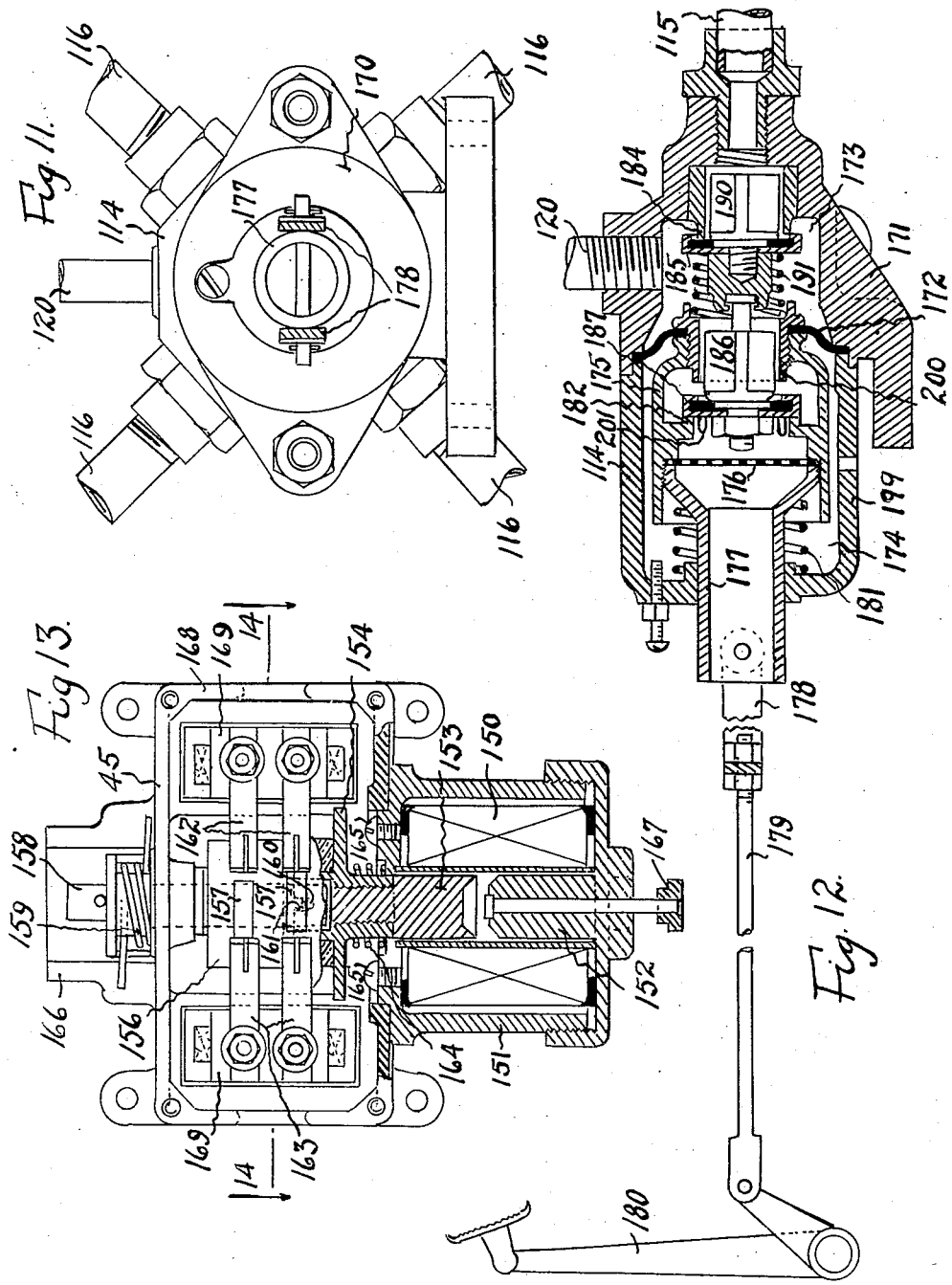

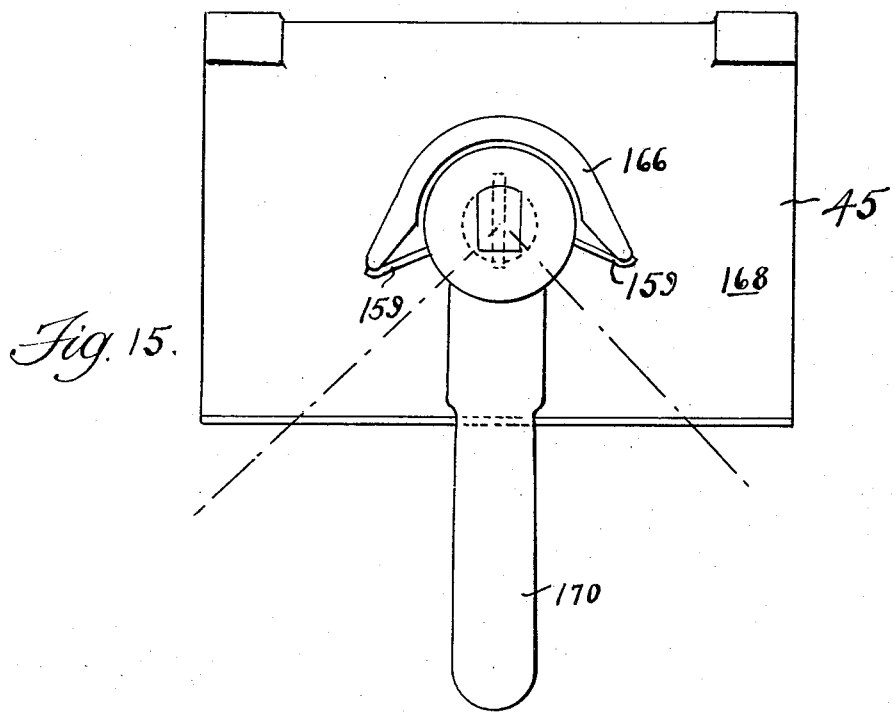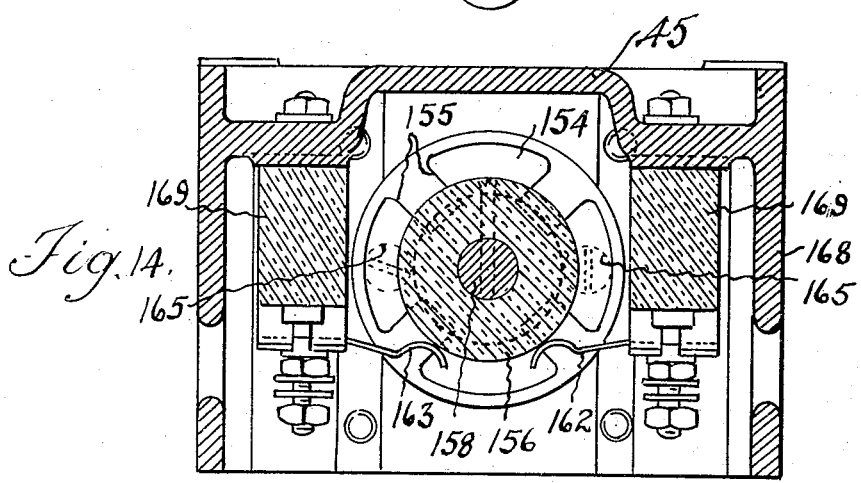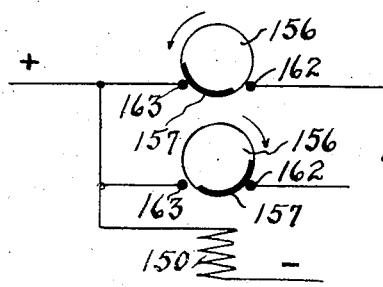

Patented May 19, 1931

1,805,983

UNITED STATES PATENT OFFICE

HORACE REGINALD HOCKLEY, OF SLOUGH, ENGLAND, ASSIGNOR TO G. D. PETERS & COMPANY, LIMITED, OF SLOUGH, ENGLAND, A BRITISH COMPANY

SYSTEM OF AND APPARATUS FOR OPERATING AND CONTROLLING THE DOORS OF RAIL OR ROAD VEHICLES

Application filed December 4, 1928, Serial No. 323,758, and in Great Britain December 9, 1927.

This invention relates to a system of and apparatus for operating and controlling the doors of vehicles, more particularly public service vehicles such as railway carriages, tramcars and motor omnibuses. The invention, however, is not limited to use on public service vehicles of the character indicated as it may be applied to any desired vehicles.

Various systems of operation and control of vehicle doors have been proposed or are in use wherein fluid at a pressure above atmospheric pressure, or electricity, or a combination of both these powers, has been employed as the operating or controlling power.

The present invention has for its principal object to provide, and principally consists in, a system of and apparatus for operating and controlling vehicle doors wherein vacuum is employed as the operating power either alone or in conjunction with electrical controlling means. A further object of the invention is to provide, and the invention further consists in, power operated apparatus for operating and controlling the doors of vehicles which are equipped with vacuum brakes wherein the power employed for such brakes is utilized as the power for operating the doors.

For the purposes of this specification it will be assumed that a source of vacuum is available on the vehicle; for instance in the case of a railway vehicle, or train of vehicles, the source of vacuum may be an exhauster or vacuum pump driven in an appropriate manner, or a steam ejector. In the case of a tramcar, a suitably driven vacuum or exhausting pump may be used, and in the case of a vehicle fitted with an internal combustion engine either an appropriately driven exhausting pump or the internal combustion engine itself, it being known to employ the latter for creating the vacuum required to operate vacuum servo-brakes.

Broadly stated the door operating apparatus according to this invention comprises in combination with the source of vacuum a vacuum cylinder or cylinders constituting a door engine for operating a door, or a door and step, a conduit controlled by a non-return valve, and including, it may be, a vacuum reservoir, adapted to connect said door engine to the source of vacuum, and a control valve adapted to control communication between the source of vacuum and the said door engine and by means of which the said door engine may be caused to operate to open or close the door, and it may be, lower or raise the step, as may be required.

The control valve just referred to may be actuated, or have its operation controlled, electrically or manually, or it may be actuated and controlled mechanically, the working of the control valve being in turn controlled by the hand or foot of an authorized person on the vehicle or train of vehicles. Further, the controlling effect of such a control valve may be governed by the depression of a treadle plate by a person or persons approaching the door with the object of entering or alighting from the vehicle.

The apparatus according to the invention may include other devices such, for instance, as check valves, automatically operating switches, and cut-out valves, as will be hereinafter explained and as will appear from the following description with reference to the accompanying drawings, in which, —

Fig. 5 is a sectional elevation of an electropneumatic, or as it may be called an "electro-vacuum", valve for use in apparatus according to this invention and itself forming part of the invention.

Fig. 6 is a sectional elevation of a check valve hereinafter described.

Fig. 7 is a sectional view of an air strainer for use in the apparatus according to the invention.

Fig. 8 illustrates diagrammatically a hand valve for use to effect opening or closing of a door by a person not on board the vehicle, say, for instance, an official in a garage in the case of a public service vehicle.

Fig. 9 shows diagrammatically the apparatus illustrated by Fig. 1 combined or associated with the vacuum brake apparatus of a vehicle, and Fig. 10 is an elevation, partly sectional, of a vacuum operated switch for use in the apparatus illustrated by Fig. 9.

Fig. 11 is an end elevational view with the connecting link in cross-section and with the pipes broken away of the brake control valve.

Fig. 12 is a longitudinal vertical cross-sectional view through this valve.

Fig. 13 is a view partly in side elevation and partly in vertical cross-section of the electro-magnetic switch.

Fig. 14 is a cross-sectional view taken on the line 14—14 of Fig. 13.

Fig. 15 is a top plan view of the electro-magnetic switch showing the manual control lever therefor.

Fig. 16 is a circuit diagram of the switch connections.

Figure 1:
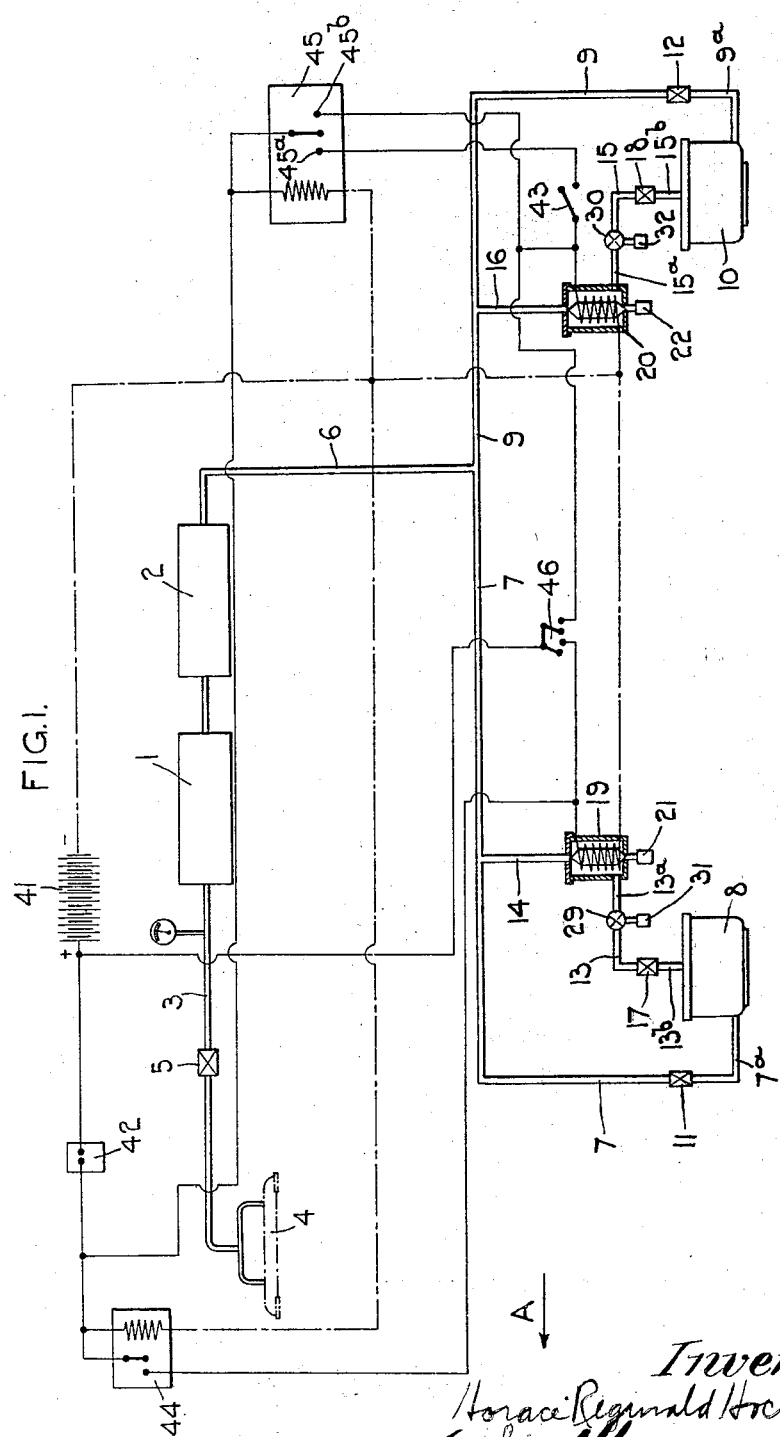
Fig. 1 shows diagrammatically apparatus according to one embodiment of the invention arranged for operating and controlling the doors of a motor omnibus provided with separate entrance and exit doors.

Referring firstly to Figs. 1 to 8 inclusive, (and also to Fig. 9 in so far as that figure comprises the apparatus shown in Fig. 1) in the embodiment of the invention shown in these figures interconnected vacuum reservoirs 1, 2 are provided connected by a pipe or conduit 3 to a source of vacuum, consisting of the induction manifold 4 of the internal combustion engines of the motor omnibus, and at a suitable point in the length of this conduit 3 a non-return valve 5 is fitted adapted when seated to close communication between the source of vacuum and the reservoir 1. This non-return valve 5, or vacuum feed valve, as it may be termed, is such that the valve member will be held to its seat when the vacuum in the induction manifold 4 is of a degree less than that of the vacuum obtaining in the reservoir 1, but will be opened when the degree of vacuum in the induction pipe rises, it may be to a predetermined extent, above that obtaining in the reservoir. The reservoirs 1, 2 are connected by pipes 6 and 7 to one side or end of the cylinder or door engine 8 for operating the front or entrance door of the vehicle and by pipes 6 and 9 to one side or end of the door engine 10 for operating the rear or exit door of the vehicle. In the pipes 7 and 9 check valves 11, 12, respectively, are arranged, these valves being conveniently of the construction shown in Fig. 6 and hereinafter described. The opposite sides or ends of the door engines 8, 10 are connected to the pipes 7 and 9 by pipes 13, 14 and 15, 16 respectively, check valves 17, 18 similar to the valves 11, 12 being included in the pipes 13, 15, and electro-vacuum valves 19, 20 (conveniently of the construction shown in Fig. 5 and hereinafter described) are arranged between the pipes 13 and 14 and the pipes 15 and 16 respectively. Each of the electro-vacuum valves 19, 20 is such that in one of its operative positions pipe 13 or 15 is in open communication with pipe 14 or 16 whilst in the other operative position pipe 13 or 15 is open to atmosphere admitted through an appropriate air strainer 21, 22, such air strainers being conveniently of the construction shown in Fig. 7 and comprising a hollow body portion 23 tapped at one end for connection to the appropriate part of the vacuum system, a straining member 24 of thimble shape and made of fine mesh copper wire gauze, a nipple 25 between the inner end of which and a shoulder in the body portion 23 an annular rim 26 on the straining member 24 is disposed, a gasket 27 of leather or other suitable material, and a union nut 28 holding the parts together. In addition to the check valves 17, 18 included in the pipes 13, 15, there are arranged in these pipes manually operable valves 29, 30 for the purposes hereinafter described. These valves are of the nature of simple three-way cocks and as they function for air admission they are fitted with air strainers 31, 32 similar to the air strainers 21, 22. One of these valves, that marked 29, and its pipe connections is shown more or less diagrammatically in Fig. 8, 29 being the plug of the valve, 33 the valve casing and 34 the operating lever or handle. In the valve casing there are three ports 35, 36 and 37 and in the plug a through port 38, 39 and a branch 40. In the position shown of the valve plug 29 the pipe 13 is open, via the ports 35, 38, 39 and 37 and pipe 13ª to the electro-vacuum valve 19, whilst if the handle 34 be turned through 90° in an anti-clockwise direction the port 37 will be closed and the pipe 13 will be open to atmosphere via the ports 35, 40, 38 and 36 and the air strainer 31.

The apparatus, during normal working of the vehicle, is controlled electrically, and for this purpose there is associated with the vacuum apparatus certain electrical equipment including, in addition to the electro-vacuum valves 19, 20, a battery 41, constituting the source of electric energy, a control switch 42 interlocked with the vehicle brake apparatus in such a manner that the apparatus is operative to open the doors only when the brakes are applied, a treadle switch 43 controlling the working of the exit door, and manually operable switches whereby the doors may be opened by the driver or conductor, or in an emergency by the passengers. The treadle switch 43 may be of a known kind, operable by a treadle plate adjacent the exit door and adapted to be depressed by the weight of a passenger desiring to alight and standing on such plate. Assuming the vehicle to carry both a driver and a conductor, a switch 44 operable by the driver and controlling the entrance door and a switch 45 operable by the conductor and controlling the exit door would preferably be provided, these switches being of any appropriate type but preferably of the type described in the specification of British Letters Patent No. 296,553 and referred to therein as magnetic switches. The conductor's switch 45 has a neutral or mid position, in which it is shown, a service working position into which it will be moved and in which its contact arm will make contact with contact 45ª, and an emergency position in which its contact arm will make contact with the contact 45ᵇ. The passengers' emergency switch is marked 46 in the diagram, and is adapted when closed to cause opening of the entrance door and also of the exit door.

The conductor's and driver's switch will now be described in detail in connection with Figs. 13 to 16, inclusive. The driver's switch is shown diagrammatically at 44 in Figs. 1 and 9 and the conductor's switch is shown diagrammatically in these figures at 45. The only distinction between these two switches is that the conductor's switch has two movable contacts and two operative positions, while the driver's switch has only one movable contact and one operative position. Otherwise both switches are mechanically and electrically the same and, in fact, the same switch may be used in both instances, the only difference being that when used as a driver's switch only one movable contact and the cooperating fixed fingers therefor are used.

In the drawings the conductor's switch has been disclosed in detail and in connection with this drawing it is pointed out that if this switch is to be used at the driver's station then only one movable contact and one set of spring fingers are connected up. This switch has been shown in Figs. 13 to 16, inclusive, in detail and is indicated generally by the reference numeral 45. It is shown as comprising a two-part casing having the lower portion 151 and the upper portion 168. Within the portion 151 is shown the solenoid winding 150 which is diagrammatically illustrated in the drawings. Within the solenoid is a fixed core 152 and a movable plunger or armature 153 mounted for vertical movement with respect to the fixed core against the action of spring 164 which tends to normally hold the parts in the position shown in Fig. 13. The upper end of the movable plunger is provided with a disc-like formation 154 which is provided with radial slots 155, as shown in Fig. 14. Secured to the plunger is a cylinder of insulating material 156 upon which are mounted the two contact strips 157 for movement therewith. Freely mounted in the upper portion of the casing for longitudinal and rotational movement is a rod 158 which projects into a cup formed in the movable plunger, as shown in Fig. 13. The cup has a slot 161 in the edge thereof and is engaged by a pin 160 which extends through the rod 158 into the slot. By means of this arrangement the rod 158, the cylinder of insulating material 156, and the plunger 153 may be given rotational movement together, while the plunger 153 may move longitudinally with respect to the rod. The rod 158 is encircled by a spring 159 which tends to normally maintain it in a central position, which position is shown in Fig. 13. The rod 158 projects above the casing and within a protecting rim 166 against which the ends of the spring 159 lie. The rod 158 is adapted to receive an operating lever 170 which is normally maintained in the central position shown in Fig. 15 by spring 159. Mounted on each side of drum 156 and within the part 168 of the casing are the insulating blocks 169 on which are mounted spring fingers 163 and 162.

In the normal position at which spring 159 holds the parts neither contact strip 157 bridges its adjacent spring fingers 163, 162. A manually operated plunger 167 is provided by means of which the movable armature may be forced upwardly when desired. Below the flange 154 and secured to the casing are two projecting pins shown in the form of screws 165. When switch 42 or switch 118 is operated it automatically supplies current to solenoid winding 150 to energize it causing plunger 153 and the insulating block 156 mounted thereon to move downwardly against the action of spring 164, in which position it is held. If normal conditions exist the conductor moves lever 170 to the left causing lower contact strip 157 to bridge the lower spring fingers 163, 162. Current is then supplied up to the treadle switch 143 and when this treadle switch is depressed the electro-magnetic valve 20 is operated to connect the engine for the rear door to the vacuum source to cause it to open the door. When lever 170 is moved by the conductor to its other position to the right the upper contact strip 157 bridges the upper spring fingers 163, 162 for supplying current directly to the electro-magnetic valves 19 and 20 to connect both the engine for the rear door and the engine for the front door to the vacuum source so that both are operated to open position. This represents an emergency operation and provides means by which both doors are opened directly without requiring the operation of the treadle switch. When this switch is used at the driver's position it only has a middle or inoperative position and can only be moved in one direction to its other or operative position. If the handle 170 is moved to the left and lower contact strip 157 and its spring fingers are employed they will be bridged and current will be supplied to electro-magnetic valve 19 to connect engine 8 to the vacuum source to open the front door. In each case when lever 170 moves the plunger and movable part of the switch either to the left or right the heads of screws 165 will come into alignment with slots 155 on disc 154 and since the electro-magnet is exerting a pulling force the plunger and movable parts connected thereto will drop down and become locked in operated position against the action of spring 199. These parts will stay locked in this position until magnet 150 is deenergized, which only occurs when the brake pedal is released to release the brakes.

At this time brake control valve 114, which as has been explained is connected to the brake pedal, is operated to open either switch 42 or switch 118 to atmospheric pressure so that it may operate to break the circuit connected thereto which includes the solenoid winding 150. As soon as this winding is deenergized spring 164 forces the movable parts of the switch upwardly and with flange 154 moves above screws 165. Spring 159 causes the movable parts to rotate back to central position so that the operated lever is in the full line position shown in Fig. 15, and the circuits connected to spring fingers 162 and 163 and contact strips 157 are broken.

The circuit connections which are shown in their general association in Figs. 1 and 9 have been shown more specifically with respect to the switch just described in greater detail in Fig. 16. The two contact strips have been shown instead of one over each other as they are in the actual device in the same plane merely for purposes of illustration. It may be well to point out that the switch thus described is used in the same construction and in the same manner in both of the circuit arrangements shown in Figs. 1 and 9.

Before describing the operation of the system illustrated by Fig. 1, the preferred constructions of the door engines, 8, 10, the check valves 11, 12, 17 and 18, the non-return or feed valve 5 and the electro-vacuum valves 19, 20 will be described.

The check valves 11, 12, 17 and 18 preferably are of the form shown in Fig. 6, and each comprises a valve body or casing 47 having a valve chamber 48 the access aperture of which is closed by a screw plug 49. Ports 50, 51 lead to the valve chamber 48, these ports being connected by a bleed passage 52 which bye-passes the valve 53 controlling the main through-way of the check valve. This valve 53 consists of a disc or washer of india-rubber secured to a valve carrier 54 pivoted at 55 to a lug on the valve seat member 56 mounted in the valve casing. The bleed port 52 is restricted by a plug 57 screwed into such port and having a hole 58 through it of the desired size the aperture giving access to said plug 57 being closed by a screw plug 59. The check valves 11 and 12 are constituted by valve devices of the kind just described which are arranged in the system with the pipes 7 and 9 connected to the respective ports 51 and the pipes 7ª and 9ª to the respective ports 50; the similar valves 17 and 18 are disposed so that the respective ports 51 are connected to the pipes 13 and 15 respectively and the ports 50 to the pipes 13ᵇ and 15ᵇ.

The non-return or feed valve 5 is preferably similar in construction to the check valve shown in Fig. 6 except that the bleed passage is omitted, the ports 50, 51 of such valve being connected respectively to the engine manifold 4 and the vacuum reservoir 1.

Referring now to Fig. 5, which shows the construction of the electro-vacuum valves 19, 20, the valve device shown in this figure comprises a solenoid coil 60 arranged in a frame or case 61 carrying the fixed core 62, 63 being the movable core of the solenoid. The core 63 has longitudinal grooves or flutes in its periphery. At its lower end the case of the solenoid is so formed as to constitute part of a valve chamber 64 in which is located a valve 65 the stem of which is connected at 66 to the core 63. The valve casing is constituted by the lower portion of the case 61, an intermediate or body portion 67 and a cover 68, the parts being screwed together as shown. The upper side of the valve chamber 64 communicates with a tube 69 in which the core 63 works with appropriate clearance and in the upper end of which the core 62 is fitted in an air-tight manner, these latter parts being, for instance, sweated together. A passage 70 is formed through the core 62 to the upper end of which the pipe 14 or 16 is connected. The lower end of the passage 70 is formed to constitute a seat for a ball valve 71 located in a recess in the upper end of the movable core 63, the ball being retained in such recess by an annular internal shoulder at the upper end of the bushing 71ª which is pressed into the recess. The seat for the valve 65, which has an india-rubber seating ring 72 is formed at the upper end of a passage 73 in the cap 68, the lower end of this passage 73 communicating with the atmosphere through an air strainer such as that shown in Fig. 7. A perforated plate or grid 74 is arranged in the valve chamber 64 and reacting between this grid and the head of the valve 65 is a helical spring 75. Ports 76, 77 are provided in the valve casing, the appropriate one (as shown 76) being connected to the pipe 13ª or 15ª of the system and the other being closed by a screw plug 78, the valve being thus right-handed or left-handed as desired. In the deenergized condition of the solenoid 60 the valve 65 will be held on its seat against the admission of air via the port 73 by the weight of the core 63 and the valve, aided by the spring 75, and evacuation may take place via the port 76, the flutes in the core 63 and the annulus between the core 63 and the tube 69 and the passage 70. On the solenoid being energized the core 63 will rise and the ball 71 will be seated at the lower end of passage 70, thus closing such passage. At the same time the valve 65 will be unseated permitting air to be admitted via the port 73, past the valve 65, to the valve chamber 64 and to flow thence through the port 76.

Figure 2:
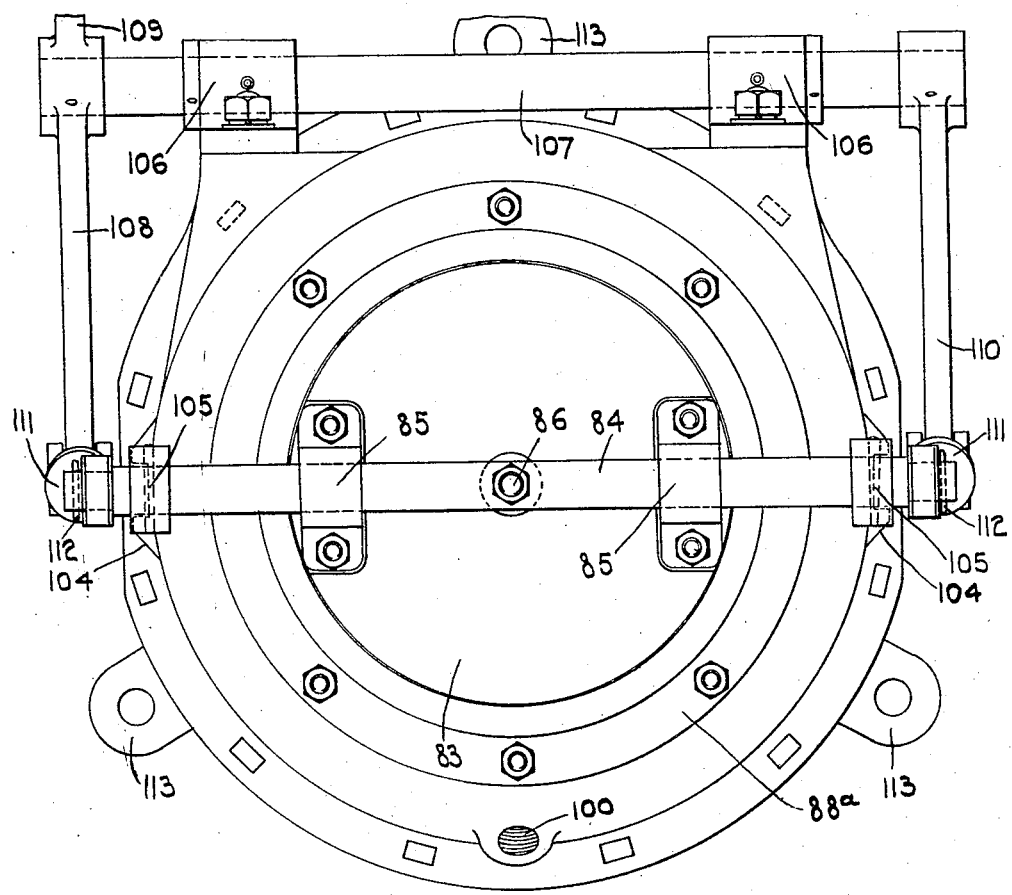
Fig. 2 is a plan, Fig. 3 a side elevation, and Fig. 4, as to its left-hand half, a front elevation and, as to its right-hand half, a sectional elevation, of a door engine which may be employed in the apparatus illustrated by Fig. 1 and which forms part of this invention.

Referring now more particularly to Figs. 2, 3 and 4, the door engine therein illustrated comprises a cylinder 79, a cover 80, and a trunk piston consisting of a head 81 and trunk 82. The door engines are preferably arranged with the cover 80 facing downwardly as shown in Figs. 2, 3 and 4, but such engines may be otherwise arranged, and are shown inverted in Figs. 1 and 9. The trunk 82 has a closed end 83 to which is secured a cross-head bar 84 by straps 85 and a stud and nut 86. The piston 81 working in the cylinder 79 is packed by a cup-leather 87 secured to the piston, and the joint between the trunk 82 and the end 88 of the cylinder is packed by a leather 89 secured to the cylinder end, between said end and a dust cover 88ª. The piston head 81 has a hollow cylindrical stem bored to two different diameters, the parts of the stem being marked 90 and 91, and slidably mounted in this hollow stem is a valve cup 92 having a closed end and a number of ports 93 through its cylindrical wall. An annular flange 94 on the valve cup working freely in the larger diameter bore 91 is adapted, when the piston has moved outwardly to a predetermined extent, to seat on a leather, india-rubber or other soft seating ring 95, arranged to lie against the annular shoulder formed at the junction of the bores 90, 91 and effectively seal the communication between the spaces 96 and 98. The annular space 99 in the cylinder surrounding the trunk 82 is maintained evacuated by the pipe 7ª or 9ª, Fig. 1, connected to the socket 100, Fig. 3. The pipe 13ᵇ or 15ᵇ, Fig. 1, is connected to the cylinder at the tapped hole 101 in the cover 80. The spaces 96 and 97 are in open communication with one another, but in the normal position shown the communication is relatively restricted, being by way of small channels or recesses 102 provided in the annular internal rib on the cover 80 against which the cup 92 seats in the normal position shown, and towards which such cup is constantly urged by a spring 103 re-acting between the cup and the closed end 83 of the trunk 82. To prevent rotary movement of the trunk piston in the cylinder 79 a pair of lugs 104 is provided at each side of the cylinder and guide bars or rods 105 are secured to the cross-head bar 84, these bars sliding between the respective lugs during the movements of the piston. Mounted in appropriate bearings 106 on the cylinder is a rock shaft 107 to which are pinned or otherwise secured at one end a bell crank having arms 108, 109 and at the other end a lever 110. The free ends of the crank arm 108 and the lever 110 are connected to the cross-head bar 84 by adjustable connecting rods 111, these rods 111 being rotatably mounted on reduced diameter end portions of the cross-head bar 84 between the shoulders formed on the cross-head bar by the reduction in diameter of said end portions and suitable securing pins 112 or the equivalent. The crank arm 109 is connected by appropriate rod or other connections to the door, or door and step, to be operated. The cylinder is suitably secured to the vehicle body or chassis by means of bolting lugs 113 on the cylinder cover 80.

It will now be convenient to describe briefly the working of the system as illustrated by the diagram constituting Fig. 1.

Assuming the vehicle to be running, the direction of travel being indicated by the arrow A, all doors will be closed, the pistons of the cylinders 8, 10 being in the position shown in Fig. 4. The switches 44, 45, 43 and 46 will be in the open positions shown, and the switch 42 will be open. The solenoids of the electro-vacuum valves 19, 20 will be de-energized and these valves therefore will be in the position preventing admission of air through the strainers 21, 22, and opening the pipes 13ª and 15ª to the pipes 14 and 16 respectively. The emergency valves 29, 30 are, of course, in their normal positions, shown in Fig. 8, providing through communication between the pipes between which they are situated. The partial vacuum created in the engine manifold 4 will set up a degree of vacuum in the reservoirs 1 and 2, the various pipes of the system and the spaces of the cylinders 8 and 10. On the driver applying the brakes to the vehicle the switch 42 will be closed, and it will remain closed until the brakes are released. When the vehicle has been brought to rest, assuming there are passengers to alight and others to pick up, the conductor will operate his switch 45 to close the circuit at contact 45ª, and the driver will close his switch 44. The operations thus far described will have energized the solenoid of the electro-vacuum valve 19, but not that of the valve 20 as its circuit will be open at the treadle switch 43. When, however, a passenger desiring to alight, steps on to the treadle plate and depresses it, closing switch 43, the circuit of the solenoid of the electro-vacuum valve 20 will be energized. The circuits will be readily traced on the diagram without detailed description. The electro-vacuum valves 19, 20 will thus both be operated and atmospheric air will flow through them and unseat the respective check valves 17, 18, and will flow past such valves to the respective cylinders 8 and 10, the pistons of which move outwardly and through the mechanical connections open the appropriate doors. Referring to Fig. 4, it will be appreciated that on air being admitted at the port 101 the vacuum obtaining in the spaces 96 and 97 will be destroyed and the piston will rise in the cylinder owing to the vacuum obtaining in the annular space 99. Air will also pass freely into the space 98 of the trunk piston 82, filling the said space 98 with air at atmospheric pressure. The subsequent movement of the piston assembly, comprising parts 81, 82, 83, 87, 90, 91 and 95, will cause the cup or valve 92 to close on its seat 95, thereby trapping the volume of air which is in the space 98 of the trunk piston 82. The cup 92 will thereupon move upwardly with the piston 81. The movement of the piston reduces the capacity of the annular space 99 and the degree of vacuum obtaining therein is lowered more quickly than it can be restored through the bleed passage in the check valve 11 or 12 and thus the power and speed of the engine will be reduced so that the final movement of the door into its fully open position will be relatively slow. The vacuum in the space 99 will in due course equalize with that obtaining in the reservoirs and pipes of the system through the constantly open bleed passage in the check valve 11 or 12. On the entry and exit of passengers being completed the driver will release the brakes and break the circuit at switch 42. When the switches 44 and 45 were operated to open the doors the electro-magnets, being energized, held such switches in their operated positions. The breaking of the circuit at switch 42 de-energizes the magnets of the switches 44 and 45 and these switches automatically return to their normal positions. At the same time the solenoids of the electro-vacuum valves 19, 20 are de-energized and these valves return to normal, closing the air admission ports and opening the spaces 96 and 97 of the cylinders of the door engines 8, 10 to the vacuum obtaining in the pipes 14 and 16 via the bleed ports in the check valves 17, 18 respectively. The pistons of the door engines will return to normal, owing to the atmospheric pressure on their ends 83, and close the doors. The return movement of these pistons, and consequently the closing of the doors, will take place somewhat slowly as evacuation of the spaces 96, 97 is effected via the restricted bleed passages of the check valves 17, 18, the air pressure seating the valve members of these check valves. The movement of the pistons will tend to increase the vacuum obtaining in the annular spaces 99 of the door engines but the check valves 11, 12 will open and the vacuum obtaining in such spaces 99 and in the pipes and reservoirs of the system will equalize. On the cylindrical wall of the cup 92 engaging the cylinder cover 80 the speed of the return of the piston of an engine will be definitely checked, as the sudden release of the air trapped in the trunk piston, which flowing into space 97 and the pipe connected to the port 101 reduces the degree of vacuum obtaining therein and thus the power which is acting to return the piston to normal, checks the movement of the piston assembly, the door being therefore checked so that a slow final closing of the door is obtained.

The passengers' emergency switch 46 is so arranged in the circuits that on its operation the battery 41 will be coupled directly to the electro-vacuum valves 19, 20 and the doors will be opened as will be readily understood from the description given above. The opening and closing of the doors by the hand valves 29, 30 will also be readily understood, as when the valves are moved through 90° in a clockwise direction air is admitted to pipes 13, 15, and when the valves are returned to normal these pipes are again connected to the evacuated pipes of the system.

Referring now to Fig. 9, which shows diagrammatically the apparatus above described combined or associated with the vacuum brake apparatus of a motor vehicle, the brake control valve 114 is connected to the vacuum reservoir 1, 2 by a pipe 115, pipes 116 leading from said control valve to the brake cylinders 117. The brake control valve will now be described in detail. This valve is shown generally at 114 in Fig. 9 and, as already mentioned, is connected for operation by means of the pedal which operates the brakes. The construction of this valve has been shown in greater detail in Figs. 11 and 12. It is shown comprising a casing having the parts 171 and 199 hermetically united together and firmly holding between them a flexible disc 172 so as to divide the interior thereof into two separated chambers 173 and 174. Within chamber 174 is a hollow casing 175 which projects through a central opening in the flexible disc 172 and forms a hermetically sealed joint therewith. A hollow tube-like member 177 is secured to this casing and holds the screen 176 in place. Pivotally connected to the casing 177 is a yoke 178 which is connected by means of a rod 179 to the brake operated pedal 180. A spring 181 surrounds the casing 177 and tends to normally hold it to the right in the position shown in Fig. 12. The interior of casing 175 is formed in the shape of a circular seat having a series of slots 201 around the edge thereof as shown. the end of part 171 of the casing has a passage through the wall thereof to which is connected the pipe 115. The wall of the passage is formed with a circular seat 184 on which a valve 185 rests. A valve 187 is provided to rest against the annular seat 182. This valve has a fluted stem 186 which lies within a passage in the thimble which is secured to casing 175 and aids in forming a hermetic seal with the flexible diaphragm 172. The valves 185 and 187 are connected together, as shown, and a spring 191 lies between the thimble and valve 185 to hold it on its seat 184 when the brakes are in released position, which is the position which the parts of the valve have as shown in Fig. 12. The thimble is provided with an annular seat 200 on which valve 187 is adapted to seat. Valve 185 is also provided with a fluted stem 190 as shown. Chamber 173 is in communication with pipes 120 and the four pipes 116. Pipe 115 extends to the vacuum tanks 1 and 2.

In the position of the valves 114, as shown in Fig. 12, valve 185 is on its seat cutting off communication between chamber 173 and pipe 115. At the same time chamber 173, pipe 120, and the four pipes 116 connected thereto are all open to the atmosphere through the thimble on casing 175, through the slots 201 on the annular seat 175 and through screen 176 and casing 177. As a result all of the brake cylinders 177 are opened to atmospheric pressure and are hence in the position where the brakes are released. When the brakes are applied by forcing pedal 180 to the left, Fig. 12, casing 175 is pulled to the left until seat 200 is in contact with valve 187. At the same time valve 185 is pulled off its seat 184 and as a result chamber 173 is in communication through pipe 115 to the vacuum sources. The final result is that pipe 120 and the four pipes 116 are all directly connected through chamber 173 to the vacuum source. This causes all the brake engines 117 to operate to apply the brakes.

It is hardly necessary to point out that the seating of valve 187 cuts off communication between chamber 173 and the atmosphere. Likewise, the vacuum sources are connected through pipe 120 to switch 118 so that it is operated to supply current to energize solenoid windings 150. By this arrangement the doors cannot possibly be opened when the brakes are not applied since switch 118 cannot move into position to energize the windings 150 unless the brakes are operated to "on" position and coincidentally therewith valve 114 is operated, as just described, to connect the brake operating engines with the vacuum source. Of course, as soon as pedal 180 is relieved of pressure it moves back to the position shown in Fig. 12 and valve 114 and its various parts take the position also shown in this figure.

A vacuum operated switch 118 is employed instead of the switch 42, Fig. 1, for control of the door apparatus by the brake apparatus, this switch 118, which is illustrated in Fig. 10, being connected to pipes 119 and 120 through a change-over valve or plug cock 121. Pipe 119 leads to the reservoirs 1 and 2 and pipe 120 to the brake control valve 114 and is connected thereto in such a manner that when the pipes 116 are evacuated or are subject to atmospheric air pressure, the pipe 120 is likewise evacuated or subject to atmospheric air pressure. The change-over valve 121 is a plug cock similar to the cocks 29, 30 and in its normal position shown the pipe 120 is coupled to the switch device 118 and the pipe 119 is cut off therefrom. If the door apparatus is to be operated independently of the brake apparatus the cock 121 is turned through 90° in a clockwise direction, coupling the pipe 119 to the switch device 118 and disconnecting pipe 120 therefrom.

The vacuum operated switch device 118 is of simple construction, as will be seen on reference to Fig. 10, and comprises a cylinder or piston chamber 122 in which is arranged a piston 123. The upper side of piston 123 is open to atmosphere and the lower side to the pipe 120 or 119 according to the position of the cock 121, Fig. 9, as already explained, the cover or head 124 of the cylinder 122 being tapped to receive an appropriate pipe connection 125, Fig. 9. Reacting between the piston 123 and the cover 124 is a helical spring 126. The piston rod 127, connected to the piston 123 extends into a casing or switch box 128 and carries a contact making ring or sleeve 129 and two insulating sleeves or bushes 130, 131. Mounted on pivots 132 in the switch box 128 are contact making levers or members 133 pressed by springs 134 into contact with the sleeves carried by the rod 127, 135 being the terminals of these contacts 133. In the position shown the insulating sleeve 130 lies between the contacts 133 so that the circuit controlled by the switch is broken. On the piston 123 being moved downwardly to the predetermined extent, which will occur when the space in chamber 122 below the piston is evacuated, the contact making sleeve 129 will be brought between the contacts 133 and the circuit controlled by the switch will be closed at these contacts. When the space below the piston 123 again becomes open to atmospheric air the piston 123 will be moved upwardly by the spring 126 into the position shown. The movements of the piston are limited in the upward direction by the inturned annular shoulder 136 on the cylinder 122, and in the downward direction by the leather or other soft gasket or packing ring 137 lying against the cylinder cover.

The operation of the apparatus shown in Fig. 9, in so far as it differs from that of the apparatus according to Fig. 1, will now be briefly described.

Assuming the vehicle to be running, and that it is to be stopped for passengers to alight and intending passengers to be picked up, the driver will apply the vacuum brakes by actuating the control valve 114,—usually by a pedal or foot-lever mechanically connected to the moving element of the valve. On the valve being actuated the pipes 116 and 120 are cut off from the atmosphere and placed in communication with the vacuum reservoirs 1 and 2. Vacuum is thereby created beneath the piston 123, Fig. 10, and the said piston moves down causing the contact sleeve 129 to make contact with the contacts 133. Thereafter the operation of opening the doors is the same as that described with reference to Fig. 1. When the vehicle is ready to start the driver releases the brakes and the control valve 114 operates to cut off the pipes 116 and 120 from the vacuum reservoirs and open them to atmosphere. The vacuum obtaining beneath the piston 123, Fig. 9, is destroyed and the piston rises, the insulating sleeve 130 coming between the contacts 133 and breaking the electric circuit through the holding magnets of the switch devices 44, 45 and the solenoids of electro-vacuum valves 19, 20. The doors now close and the switch devices 44, 45 return to normal as described with reference to Fig. 1.

Where space permits a single door engine having a cylinder of appropriate diameter will be employed for operating the respective door, but in the event of the available space limiting the diameter of cylinder that may be fitted, a plurality of relatively small diameter cylinders may be employed to provide the required power, these cylinders being operatively connected to a common actuating connection to the door so as to constitute in effect a single door engine. Further if desired, diaphragm cylinders might be employed as the door engines instead of the piston type cylinders above described.

Where the fluid pressure or vacuum brakes are fitted to the vehicle the brakes and door apparatus may be interlocked by means of an electrically controlled valve or valves in such a manner that the brakes cannot be released whilst the door or doors is or are open.

Where the apparatus is fitted to a rail vehicle or train of vehicles, a set of the apparatus, with the possible exception of the vacuum reservoir which need not be duplicated, would be provided for each side of the vehicle, and suitable change-over cocks or switches would be included in the equipment whereby the appropriate set of apparatus could be rendered operative on the direction of running of the vehicle being reversed.

The apparatus according to this invention for use on electrically propelled tramway or railway vehicles or trolley-buses may, if desired, be interlocked with the traction controller, or with the dead-man's handle on the traction controller or on the driver's brake valve, as by a switch in the electric circuit of the apparatus, in such a manner that only when the controller is in the "off" position or when the pressure of the driver's hand on said dead-man's handle is relieved may the door or doors be opened, and also, if desired, means may be provided for isolating the traction power circuit from the source of supply current, whilst the, or any, door remains open. Further, if desired, the apparatus may embody means whereby the doors will be held closed whilst the speed of the car exceeds a predetermined speed; for instance there might be included in the door engine control circuit an electro-magnetically actuated switch adapted to break the said control circuit when traction current is being fed to the traction motor or when the car is running with current shut off and the traction motor is generating a dynamic current above a predetermined value.

The door operating and controlling apparatus or equipment according to this invention may include a valve for operation by the passengers in an emergency, instead of the emergency switch above described, to effect opening of the door or doors. The emergency switch or valve may, if desired, be enclosed in a suitably sealed box.

The apparatus may, if desired, include a treadle plate operated switch in the circuit of the entrance door, the arrangement being such that the entrance door will be opened only when the treadle plate is depressed by a passenger who has boarded the vehicle and approached the door.

It is to be understood that the invention is not restricted to the constructional details herein described, as these might be varied considerably without departing from the invention. For instance, if desired the electrical portion of the apparatus could be omitted and instead of the doors being controlled by electro-vacuum valves an appropriate hand actuated rotary or other valve might be employed, a valve operated by the treadle being provided for controlling the exit door.

What I claim is:—

1. In a system of the type described for use on vehicles having power operated brakes and doors, the combination comprising a vacuum source, vacuum engines for operating the doors on the vehicle, vacuum engines for operating the brakes on the vehicle, connections between said door and brake engines and said vacuum source including electro-magnetic valves, and means connected to said electro-magnetic valves for energizing them when the brakes are applied including manually operated switches.

2. In a system of the type described for use on vehicles having power operated brakes and power operated doors, the combination comprising a vacuum source, vacuum engines for operating the doors of the vehicle and the brakes of the vehicle, connections between the vacuum source and all of said engines, electro-magnetic valves in the connections to the door engines, a brake control valve in the connections to the brake engines, said brake control valve being adapted to be operated by the brake pedal, electric circuits for said electro-magnetic valves, a vacuum switch included in said circuit and connected to said brake control valve, and electro-magnetic switches in said circuits for controlling said electro-magnetic valves, said electro-magnetic switches being inoperative except when the brakes are applied to operate the brake control valve to connect the vacuum switch with the vacuum source.

3. In a system of the type described, the combination of a vacuum source, door vacuum engines and connections between said engines and said vacuum source, electro-magnetic switches in the connections to the door vacuum engines, circuits for said electro-magnetic valves, manual switches in said circuits, and a treadle switch in said circuits arranged so that said treadle switch may energize said electro-magnetic valves when any one of said manual switches are closed.

4. In a door and brake control system of the type described for use on buses operated by internal combustion engines, the combination comprising vacuum means connected to the intake manifold of the combustion engine to provide a vacuum source, vacuum engines for operating the brakes on the bus, vacuum engines for operating the doors on the bus, connections between the vacuum source and all of said engines, electro-magnetic valves in the connections to the door vacuum engines, a brake control valve in the connection to the brake vacuum engines, said brake control valve being adapted to be operated by the brake control pedal of the bus, electric circuits for said electro-magnetic valves, a vacuum operated switch in said circuit connected to said brake control valve, and electro-magnetic switches in said circuits adapted to be energized when said vacuum switch is closed upon the operation of the brake pedal and the brake control valve, said electro-magnetic switches being arranged to complete the circuits to said electro-magnetic valves upon manual operation thereof after energization by the closing of the vacuum switch.

5. In a door and brake control system of the type described for use on buses operated by internal combustion engines, the combination comprising vacuum means connected to the intake manifold of the combustion engine to provide a vacuum source, vacuum engines for operating the brakes on the bus, vacuum engines for operating the doors on the bus, connections between the vacuum source and all of said engines, electro-magnetic valves in the connections to the door vacuum engines, a brake control valve in the connection to the brake vacuum engines, said brake control valve being adapted to be operated by the brake control pedal of the bus, electric circuits for said electro-magnetic valves, a vacuum operated switch in said circuit connected to said brake control valve, electro-magnetic switches in said circuits adapted to be energized when said vacuum switch is closed upon the operation of the brake pedal and the brake control valve, said electro-magnetic switches being arranged to complete the circuits to said electro-magnetic valves upon manual operation thereof after energization by the closing of the vacuum switch, and a treadle control switch in said circuits prepared for energization of said electro-magnetic valves when said electro-magnetic switches are manually operated.

6. In a system of the type described for use on vehicles having power operated doors and brakes, the combination comprising a source of vacuum, vacuum door operating engines and vacuum brake operating engines connected to said vacuum source, a valve in said connections arranged to be operated when the braking operation is initiated, electro-magnetic valves in the connections to the vacuum door engines, circuits for said electro-magnetic valves, and treadle and manually operated switches in said circuits arranged so that when the treadle switch is closed the electro-magnetic valves are operated if the manual switches are closed.

7. In a system of the type described for use on vehicles having power operated doors and brakes, the combination comprising a source of vacuum, vacuum door operating engines and vacuum brake operating engines connected to said vacuum source, a valve in said connections arranged to be operated when the braking operation is initiated, electro-magnetic valves in the connections to the vacuum door engines, circuits for said electro-magnetic valves, a vacuum operated switch in said circuits and a connection from said switch to said brake valve and electro-magnetic-manual switches in said circuits, said vacuum switch operating to close upon the operation of the brake valve during the initiating operation of applying the brakes to energize the electro-magnetic-manual switches, said electro-magnetic-manual switches being prepared to energize said electro-magnetic valves to operate the vacuum door engines by the closing of the vacuum switch and actually operating said valves when the operation of any one of the electro-magnetic-manual valves is completed manually.

8. In a system of the type described for use on vehicles having power operated doors, the combination comprising a source of vacuum, vacuum engines for operating the doors connected to said source, electro-magnetic valves included in said connection, circuits for said electro-magnetic valves, and a driver's and a conductor's switch in said circuits, said conductor's switch having two positions, one position completing the circuit to the electro-magnetic valve of one door engine to cause its operation and the other position completing the circuit of all the electro-magnetic valves to cause all the doors to open, and said driver's switch having one operative position to complete the circuit to another electro-magnetic valve to operate another door independently of the others.

9. In a system of the type described for use on vehicles having a power operated door adjacent the driver and a power operated door adjacent the conductor, the combination comprising a source of vacuum, a vacuum engine connected to each of said doors, connections between said engines and said vacuum source, electro-magnetic valves in said connections, circuits for said electro-magnetic valves, and a conductor's and a driver's switch in said circuits, said conductor's switch having two operative positions one of which completes circuits to the electro-magnetic valve for the engine of the door adjacent his position to cause it to open and the other of which completes the circuits to the electro-magnetic valves for both engines to cause both of the doors to operate, and said driver's switch having one operative position to complete the circuits to the electro-magnetic switch of the engine for operating the door adjacent his position.

In testimony whereof I affix my signature.

HORACE REGINALD HOCKLEY.